United States Patent
Banno

(10) Patent No.: US 12,149,928 B2
(45) Date of Patent: *Nov. 19, 2024

(54) VEHICLE COMMUNICATION SYSTEM, COMMUNICATION METHOD, AND STORAGE MEDIUM STORING COMMUNICATION PROGRAM

(71) Applicant: TOYOTA JIDOSHA KABUSHIKI KAISHA, Toyota (JP)

(72) Inventor: Masahide Banno, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/380,024

(22) Filed: Oct. 13, 2023

(65) Prior Publication Data

US 2024/0040374 A1 Feb. 1, 2024

Related U.S. Application Data

(63) Continuation of application No. 17/524,906, filed on Nov. 12, 2021, now Pat. No. 11,832,098.

(30) Foreign Application Priority Data

Nov. 13, 2020 (JP) .................................. 2020-189829

(51) Int. Cl.
*H04K 1/00* (2006.01)
*H04W 4/40* (2018.01)
(Continued)

(52) U.S. Cl.
CPC ............. *H04W 12/03* (2021.01); *H04W 4/40* (2018.02); *H04W 12/04* (2013.01); *H04W 12/06* (2013.01); *H04L 2101/622* (2022.05)

(58) Field of Classification Search
CPC ..... H04W 12/03; H04W 12/04; H04W 12/06; H04W 4/40
(Continued)

(56) References Cited

U.S. PATENT DOCUMENTS

2008/0133921 A1* 6/2008 Yao ........................ H04L 9/0891
713/175
2016/0297401 A1 10/2016 Haga et al.
(Continued)

FOREIGN PATENT DOCUMENTS

| JP | 2018-074435 A | 5/2018 |
| JP | 2021-083005 A | 5/2021 |
| KR | 10-2020-0020515 A | 2/2020 |

OTHER PUBLICATIONS

Specification of Secure Onboard Communication, AUTOSAR, Release R19-11, pp. 1-161.
(Continued)

*Primary Examiner* — Brandon Hoffman
*Assistant Examiner* — Samuel Ambaye
(74) *Attorney, Agent, or Firm* — Oliff PLC

(57) ABSTRACT

A vehicle communication system, including plural control devices configured to carry out communication with one another, wherein a transmitting device and a receiving device each include a memory and a processor. The processor at the transmitting device generates first authentication information based on a message and the encryption key, and in a case in which there is an abnormality at the encryption key, transmits the predetermined authentication information and the message to the receiving device. The processor at the receiving device generates second authentication information based on the encryption key and the received message, collates the first authentication information and the second authentication information, and authenticates the message, and in a case in which, after starting-up of the receiving
(Continued)

device, authentication has not succeeded even once, and the received first authentication information and the predetermined authentication information match, accepts the received message.

6 Claims, 8 Drawing Sheets

(51) Int. Cl.
    *H04W 12/03*     (2021.01)
    *H04W 12/04*     (2021.01)
    *H04W 12/06*     (2021.01)
    *H04L 101/622*     (2022.01)

(58) Field of Classification Search
    USPC .......................................... 380/270
    See application file for complete search history.

(56) References Cited

U.S. PATENT DOCUMENTS

| | | | |
|---|---|---|---|
| 2018/0124180 A1* | 5/2018 | Banno | H04L 63/12 |
| 2018/0234248 A1* | 8/2018 | Imamoto | H04L 63/0428 |
| 2021/0160256 A1 | 5/2021 | Banno | |

OTHER PUBLICATIONS

Mar. 16, 2023 Office Action issued in U.S. Appl. No. 17/524,906.
Jul. 19, 2023 Notice of Allowance issued in U.S. Appl. No. 17/524,906.

* cited by examiner

VEHICLE COMMUNICATION SYSTEM, COMMUNICATION METHOD, AND STORAGE MEDIUM STORING COMMUNICATION PROGRAM

CROSS-REFERENCE TO RELATED APPLICATIONS

This application is a continuation of U.S. application Ser. No. 17/524,906 filed Nov. 12, 2021, which claims priority under 35 USC 119 from Japanese Patent Application No. 2020-189829 filed on Nov. 13, 2020, the contents of each of these applications is incorporated herein by reference.

BACKGROUND

Technical Field

The present disclosure relates to a vehicle communication system, a communication method, and a storage medium storing a communication program.

Related Art

A communication system in which plural ECUs carry out communication is disclosed in Japanese Patent Application Laid-Open (JP-A) No. 2018-074435. In this communication system, at the transmitting-side ECU, a MAC (Message Authentication Code) is generated from a message and on the basis of an encryption key that the transmitting-side ECU possesses, and the message and the generated MAC are transmitted.

On the other hand, at the receiving-side ECU that receives the message and the MAC, a MAC for verification is generated on the basis of the received message and an encryption key that the receiving-side ECU possesses, and the received MAC and the generated MAC for verification are compared, and authentication of the message is carried out.

Specification of Secure Onboard Communication, AUTOSAR, Release R19-11 prescribes specifications relating to safety in cases in which plural ECUs carry out communication.

These specifications state that a predetermined value that is stored in advance is used for the MAC in a case in which an abnormality arises in the encryption key at the transmitting-side ECU, such as in a case in which a different encryption key is used or the like.

In the communication system of JP-A No. 2018-074435, in a case in which the transmitting-side ECU is replaced, and the encryption key is not updated and differs from that of the master ECU, the message cannot be decoded at the receiving-side ECU even if the message is encrypted and transmitted by the transmitting-side ECU. In such a case, applying the technique of Secure Onboard Communication, AUTOSAR, Release R19-11, to the communication system of JP-A No. 2018-074435, and as a temporary alternative measure, having the transmitting-side ECU use a predetermined value for the MAC, and transmit the MAC together with the message, might be considered. At the receiving-side ECU, in a case in which the received MAC and the predetermined MAC match, it is detected that there is a key abnormality that requires updating of the encryption key, and the message is accepted temporarily. However, also after the encryption key is updated, if a message is accepted by using the predetermined MAC, there is the concern that it will be erroneously detected that a key abnormality that requires updating of the encryption key has arisen, and that a message that should be discarded will be accepted.

SUMMARY

An object of the present disclosure is to provide a vehicle communication system, a communication method, and a storage medium storing a communication program, which suppress erroneous detection that a key abnormality requiring updating of an encryption key has arisen in spite of the fact that updating of the encryption key has been carried out, and suppress the accepting of a message that should be discarded.

A first aspect is a vehicle communication system, including plural control devices configured to carry out communication with one another, the plural control devices including a transmitting device at a transmitting side and a receiving device at a receiving side, wherein: the transmitting device and the receiving device each include a memory in which an encryption key and predetermined authentication information are stored, and a processor that is coupled to the memory. The processor at the transmitting device generates first authentication information based on a message and the encryption key that is stored in the memory of the transmitting device, and in a case in which there is no abnormality at the encryption key, transmits the generated first authentication information and the message to the receiving device, and in a case in which there is an abnormality at the encryption key, transmits the predetermined authentication information and the message to the receiving device. The processor at the receiving device generates second authentication information based on the encryption key stored in the memory of the receiving device and the message received from the transmitting device, collates the first authentication information received from the transmitting device and the generated second authentication information, and authenticates the message, and in a case in which, after starting-up of the receiving device, authentication has not succeeded even once, and the received first authentication information and the predetermined authentication information match, accepts the received message regardless of a result of the authentication.

The vehicle communication system of the first aspect is structured to include plural control devices that carry out communication with one another. The transmitting device that is the control device at the transmitting side and the receiving device that is the control device at the receiving side respectively store an encryption key and predetermined authentication information in the memory. On the basis of the encryption key and the message, the processor of the transmitting device generates first authentication information. In a case in which there is no abnormality at the encryption key, the processor of the transmitting device transmits the generated first authentication information and the message to the receiving device. Further, in a case in which there is an abnormality at the encryption key, the processor of the transmitting device transmits the predetermined authentication information and the message to the receiving device. Here, "a case in which there is an abnormality at the encryption key" is a case in which the encryption key that is stored differs from the encryption key that was originally used in order to generate the first authentication information, and, for example, is a case in which the key values differ.

On the other hand, on the basis of the encryption key and the message received from the transmitting device, the processor of the receiving device generates second authentication information, and collates the first authentication information, which was received from the transmitting device, and the generated second authentication information, and authenticates the message. Further, in a case in which authentication has not been successful even one time after the starting-up of the receiving device, and the received first authentication information and the predetermined authentication information match, the processor of the receiving device accepts the received message regardless of the results of the authenticating.

In this vehicle communication system, in a case in which updating of the encryption key was not carried out at the time when the transmitting-side control device was replaced, authentication fails at the receiving device. However, up until updating of the encryption key is carried out and authentication is successful, the received message is accepted regardless of the results of the authenticating, provided that the received first authentication information and the predetermined authentication information match. On the other hand, if the encryption key is updated and authentication is successful once, thereafter, the received message is not accepted even if the received first authentication information and the predetermined authentication information match. Therefore, in accordance with this vehicle communication system, it being erroneously detected that a key abnormality that requires updating of the encryption key has arisen in spite of the fact that updating of the encryption key has been carried out, and the accepting of a message that should be discarded, are suppressed.

In a vehicle communication system of a second aspect, in the vehicle communication system of the first aspect, the processor of the receiving device discards the received message in a case in which the authentication fails in a current instance of receiving, and, after start-up of the receiving device, the authentication succeeds once.

In accordance with the vehicle communication system of the second aspect, security after updating of the encryption key has been carried out can be ensured.

In a vehicle communication system of a third aspect, in the vehicle communication system of the first or second aspect, the processor of the receiving device discards the received message in a case in which the authentication fails, and the first authentication information received from the transmitting device and the predetermined authentication information do not match.

In accordance with the vehicle communication system of the third aspect, security can be ensured by discarding a message in a case in which a key abnormality, which requires updating of the encryption key, has not arisen.

In a vehicle communication system of a fourth aspect, in the vehicle communication system of any one of the first through third aspects, if there is an abnormality at the encryption key during a predetermined time period from starting-up of the transmitting device, the processor of the transmitting device rewrites the generated first authentication information with the predetermined authentication information.

In accordance with the vehicle communication system of the fourth aspect, in a case in which there is an abnormality of the encryption key at the transmitting device, an abnormality of the encryption key can be indicated to the transmitting device.

A fifth aspect is a communication method in a vehicle communication system, the system including plural control devices that store encryption keys and predetermined authentication information and that carry out communication with one another, plural control devices including a transmitting device at a transmitting side and a receiving device at a receiving side, wherein computers of the respective control devices execute processing including: at the transmitting device: generating first authentication information based on a message and the encryption key that is stored in the transmitting device, and in a case in which there is no abnormality at the encryption key, transmitting the generated first authentication information and the message to the receiving device, and in a case in which there is an abnormality at the encryption key, transmitting the predetermined authentication information and the message to the receiving device; and at the receiving device: generating second authentication information based on the encryption key stored in the receiving device and the message received from the transmitting device, collating the first authentication information received from the transmitting device and the generated second authentication information, and authenticating the message, and in a case in which, after starting-up of the receiving device, the authentication has not succeeded even once, and the received first authentication information and the predetermined authentication information match, accepting the received message regardless of a result of the authentication.

The communication method of the fifth aspect is executed by computers at a vehicle communication system that is structured to include plural control device that carry out communication with one another. The transmitting device that is the control device at the transmitting side and the receiving device that is the control device at the receiving side respectively store an encryption key and predetermined authentication information. On the basis of the encryption key and the message, the computer of the transmitting device generates first authentication information. In a case in which there is no abnormality at the encryption key, the computer of the transmitting device transmits the generated first authentication information and the message to the receiving device. Further, in a case in which there is an abnormality at the encryption key, the computer of the transmitting device transmits the predetermined authentication information and the message to the receiving device. Here, "a case in which there is an abnormality at the encryption key" is as described above.

On the other hand, on the basis of the encryption key and the message received from the transmitting device, the computer of the receiving device generates second authentication information, and collates the first authentication information, which was received from the transmitting device, and the generated second authentication information, and authenticates the message. Further, in a case in which authentication has not been successful even one time after the starting-up of the receiving device, and the received first authentication information and the predetermined authentication information match, the computer of the receiving device accepts the received message regardless of the results of the authenticating.

In this communication method, in a case in which updating of the encryption key was not carried out at the time when the transmitting-side control device was replaced, authentication fails at the receiving device. However, up until updating of the encryption key is carried out and authentication is successful, the received message is accepted regardless of the results of the authenticating, provided that the received first authentication information and the predetermined authentication information match. On the other hand, if the encryption key is updated and authentication is successful once, thereafter, the received message is not accepted even if the received first authentication information and the predetermined authentication information match. Therefore, in accordance with this communication method, it being erroneously detected that a key abnormality that requires updating of the encryption key has arisen in spite of the fact that updating of the encryption key has been carried out, and the accepting of a message that should be discarded, are suppressed.

A sixth aspect is a non-transitory storage medium storing a communication program. In a vehicle communication system including plural control devices that store encryption keys and predetermined authentication information and that carry out communication with one another, plural control devices including a transmitting device at a transmitting side and a receiving device at a receiving side, is executable by respective computers of the respective control devices to perform processing including: at the transmitting device: generating first authentication information based on a message and the encryption key that is stored in the transmitting device, and in a case in which there is no abnormality at the encryption key, transmitting the generated first authentication information and the message to the receiving device, and in a case in which there is an abnormality at the encryption key, transmitting the predetermined authentication information and the message to the receiving device; and at the receiving device: generating second authentication information based on the encryption key stored in the receiving device and the message received from the transmitting device, collating the first authentication information received from the transmitting device and the generated second authentication information, and authenticating the message, and, in a case in which, after starting-up of the receiving device, the authentication has not succeeded even once, and the received first authentication information and the predetermined authentication information match, accepting the received message regardless of a result of the authentication.

The communication program, which is recorded on the non-transitory storage medium of the sixth aspect, causes computers to execute the following processings in a vehicle communication system that is structured to include plural control device that carry out communication with one another. The transmitting device that is the control device at the transmitting side and the receiving device that is the control device at the receiving side respectively store an encryption key and predetermined authentication information. On the basis of the encryption key and the message, the computer of the transmitting device at which this program is executed generates first authentication information. In a case in which there is no abnormality at the encryption key, the computer of the transmitting device transmits the generated first authentication information and the message to the receiving device. Further, in a case in which there is an abnormality at the encryption key, the computer of the transmitting device transmits the predetermined authentication information and the message to the receiving device. Here, "a case in which there is an abnormality at the encryption key" is as described above.

On the other hand, on the basis of the encryption key and the message received from the transmitting device, the computer of the receiving device at which this program is executed generates the second authentication information, and collates the first authentication information, which was received from the transmitting device, and the generated second authentication information, and authenticates the message. Further, in a case in which authentication has not been successful even one time after the starting-up of the receiving device, and the received first authentication information and the predetermined authentication information match, the computer of the receiving device accepts the received message regardless of the results of the authenticating.

In this communication program, in a case in which updating of the encryption key was not carried out at the time when the transmitting-side control device was replaced, authentication fails at the receiving device. However, up until updating of the encryption key is carried out and authentication is successful, the received message is accepted regardless of the results of the authenticating, provided that the received first authentication information and the predetermined authentication information match. On the other hand, if the encryption key is updated and authentication is successful once, thereafter, the received message is not accepted even if the received first authentication information and the predetermined authentication information match. Therefore, in accordance with this communication program, it being erroneously detected that a key abnormality that requires updating of the encryption key has arisen in spite of the fact that updating of the encryption key has been carried out, and the accepting of a message that should be discarded, are suppressed.

In accordance with the present disclosure, erroneous detection that a key abnormality requiring updating of the key has arisen in spite of the fact that updating of an encryption key has been carried out, and the accepting of a message that should be discarded, can be suppressed.

BRIEF DESCRIPTION OF THE DRAWINGS

An exemplary embodiment of the present disclosure will be described in detail based on the following figures, wherein.

DETAILED DESCRIPTION (Vehicle Communication System)

Figure 1:
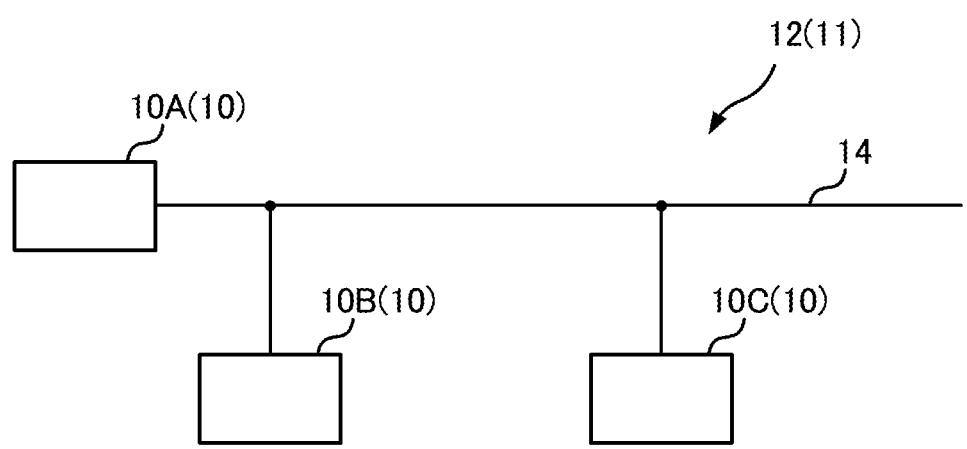
FIG. 1 is a drawing showing the schematic structure of a vehicle communication system relating to the embodiment.

FIG. 1 is a block drawing showing the schematic structure of a vehicle communication system 12 relating to an embodiment. As shown in FIG. 1, the vehicle communication system 12 relating to the present embodiment is structured to include plural ECUs (Electronic Control Units) 10 that are control devices, and a bus 14 that is a communication path that connects the plural ECUs 10 together. For example, the vehicle communication system 12 of the present embodiment is formed as a network that connects the respective ECUs 10 that are provided at a vehicle 11.

Three ECUs 10 that are an ECU 10A, an ECU 10B and an ECU 10C are shown in FIG. 1. The ECU 10A corresponds to the master ECU, and the ECUs 10B, 10C correspond to slave ECUs. Hereinafter, description is given with the ECU 10B being the transmitting-side ECU 10 that transmits a communication frame, and the ECU 10C being the receiving-side ECU 10 that receives the communication frame. The ECU 10B is an example of the transmitting device, and the ECU 10C is an example of the receiving device.

Note that the system is not limited to the ECUs 10A, 10B, 10C, and even more ECUs 10 may be connected to the bus 14. Further, the vehicle communication system 12 of the present embodiment employs a bus-type bus structure, but is not limited to this and may employ a star-type, a ring-type, or a line-type (a daisy chain connection) bus structure.

The vehicle communication system 12 of the present embodiment employs the CAN (Controller Area Network) protocol, or the CAN-FD (CAN with Flexible Data Rate) protocol whose communication speed is faster than that of the CAN protocol, as the communication technique for carrying out communication among the ECUs 10. Note that the communication technique is not limited to this, and LAN standards such as Ethernet (registered trademark) or the like may be employed.

(ECU)

Figure 2:
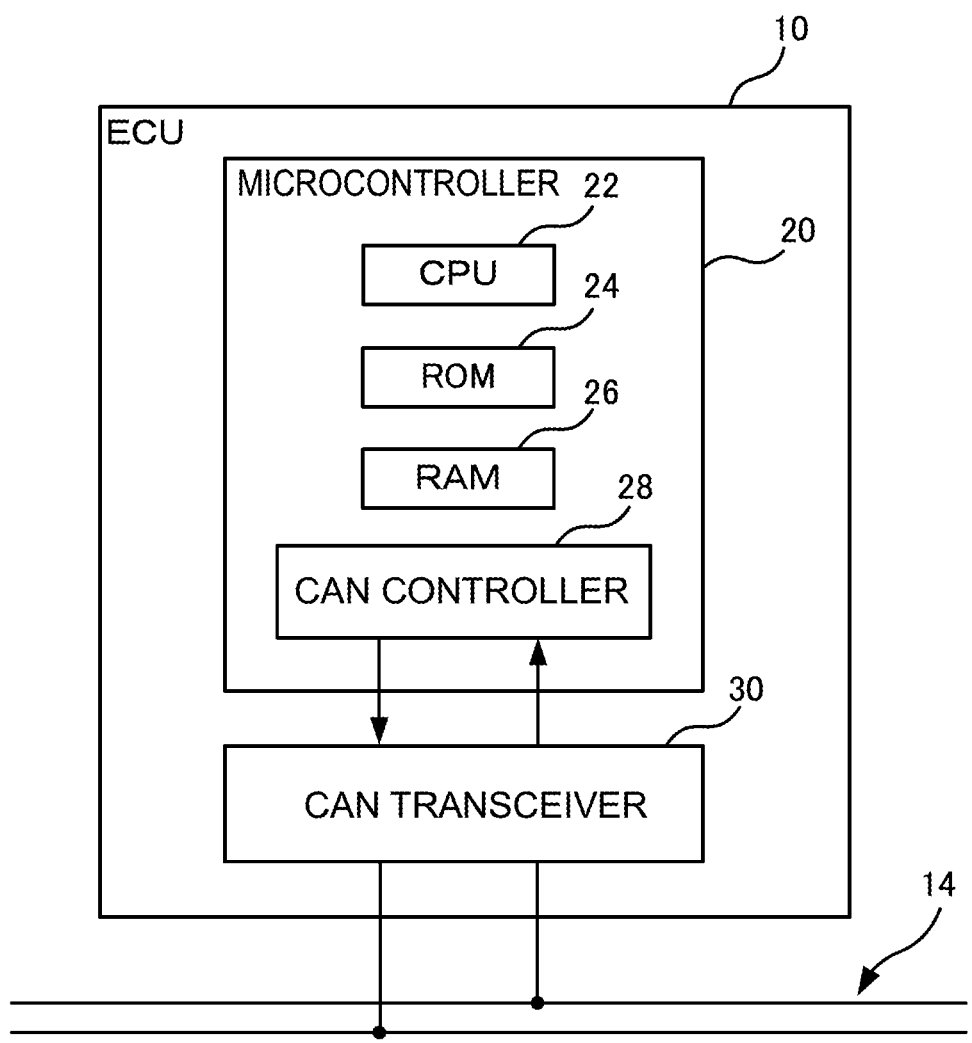
FIG. 2 is a block drawing showing hardware structures of an ECU of the embodiment.

As shown in FIG. 2, the ECU 10 of the present embodiment is structured to include a microcontroller 20 and a CAN transceiver 30. The microcontroller 20 is structured to include a CPU (Central Processing Unit) 22, a ROM (Read Only Memory) 24, a RAM (Random Access Memory) 26, and a CAN controller 28.

The CPU 22 is a central computing processing unit, and executes various programs and controls respective sections. Namely, the CPU 22 reads-out a program from the ROM 24, and executes the program by using the RAM 26 as a workspace. In the present embodiment, an execution program 100 is stored in the ROM 24 (see FIG. 3). The CPU 22 is an example of the processor, and the ROM 24 is an example of the memory. Further, the execution program 100 is an example of the communication program.

Figure 3:
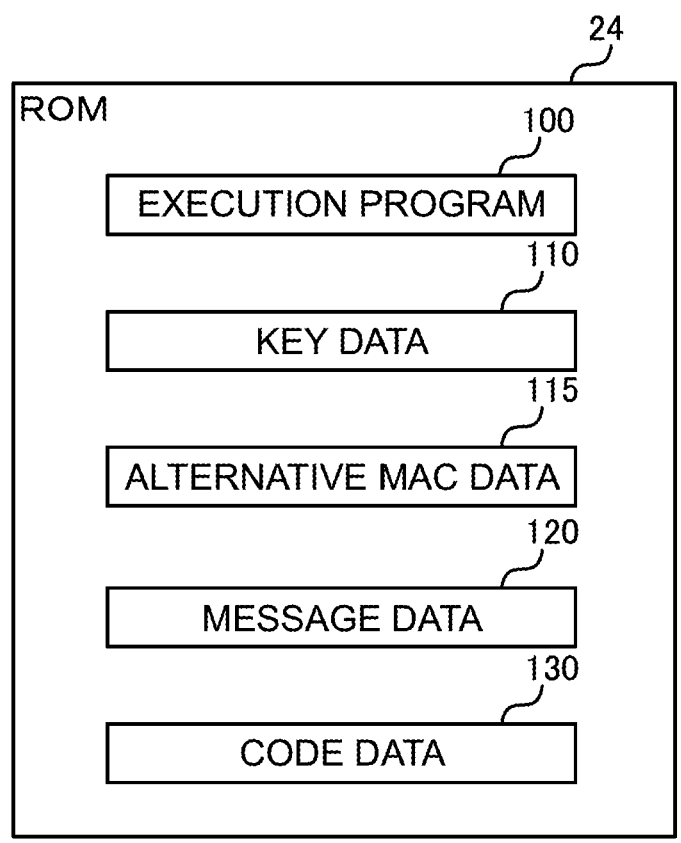
FIG. 3 is a block drawing showing an example of the structure of a ROM of the embodiment.

The ROM 24 stores various programs and various data. As shown in FIG. 3, the ROM 24 stores the execution program 100, key data 110, alternative MAC data 115, message data 120, and code data 130. Data of an encryption key 52 (see FIG. 5 and FIG. 6) for generating a MAC (Message Authentication Code) is stored in the key data 110. An alternative MAC 67, which is used in a key abnormality state that is described later, is stored in the alternative MAC data 115 (see FIG. 6). The alternative MAC 67 is an example of predetermined authentication information.

A message 62 (see FIG. 5 and FIG. 6) that the ECU 10 is to transmit or has received is stored in the message data 120. A DTC (Diagnostic Trouble Code) that expresses the problem of the device, and a Rob (Record of Behavior) code that expresses the communication abnormality, are stored in the code data 130. Further, in a case in which the ECU 10 is a slave ECU, if it is detected that there is an abnormality at the encryption key 52 of its own device or of another slave ECU that transmitted communication data 60, the message data 120 can store information expressing the abnormality.

The RAM 26, as a workspace, temporarily stores programs and data.

The CAN controller 28 realizes functions relating to CAN protocol and CAN-FD protocol, e.g., the functions of communication arbitration, error checking, and the like.

The CAN transceiver 30 is connected to the microcontroller 20 and the bus 14, and has the functions of transmitting, to the bus 14, the communication frame that is inputted from the microcontroller 20, and inputting, to the microcontroller 20, the communication frame that is transferred by the bus 14.

Figure 4:
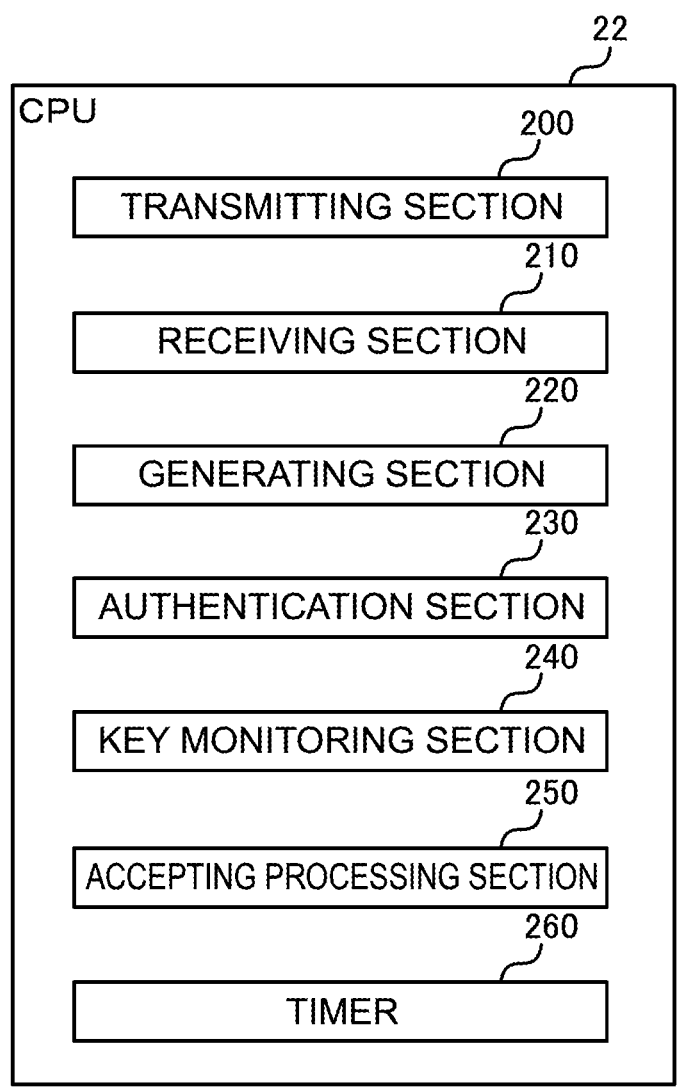
FIG. 4 is a block drawing showing an example of functional structures of a CPU of the embodiment.

FIG. 4 is a block drawing showing an example of the functional structures of the CPU 22. As shown in FIG. 4, the CPU 22 has a transmitting section 200, a receiving section 210, a generating section 220, an authenticating section 230, a key monitoring section 240, an accepting processing section 250 and a timer 260. These respective functional structures are realized by the CPU 22 reading-out the execution program 100 that is stored in the ROM 24, and executing the execution program 100.

The transmitting section 200 has the function of transmitting communication frames to the other ECUs 10.

Figure 5:
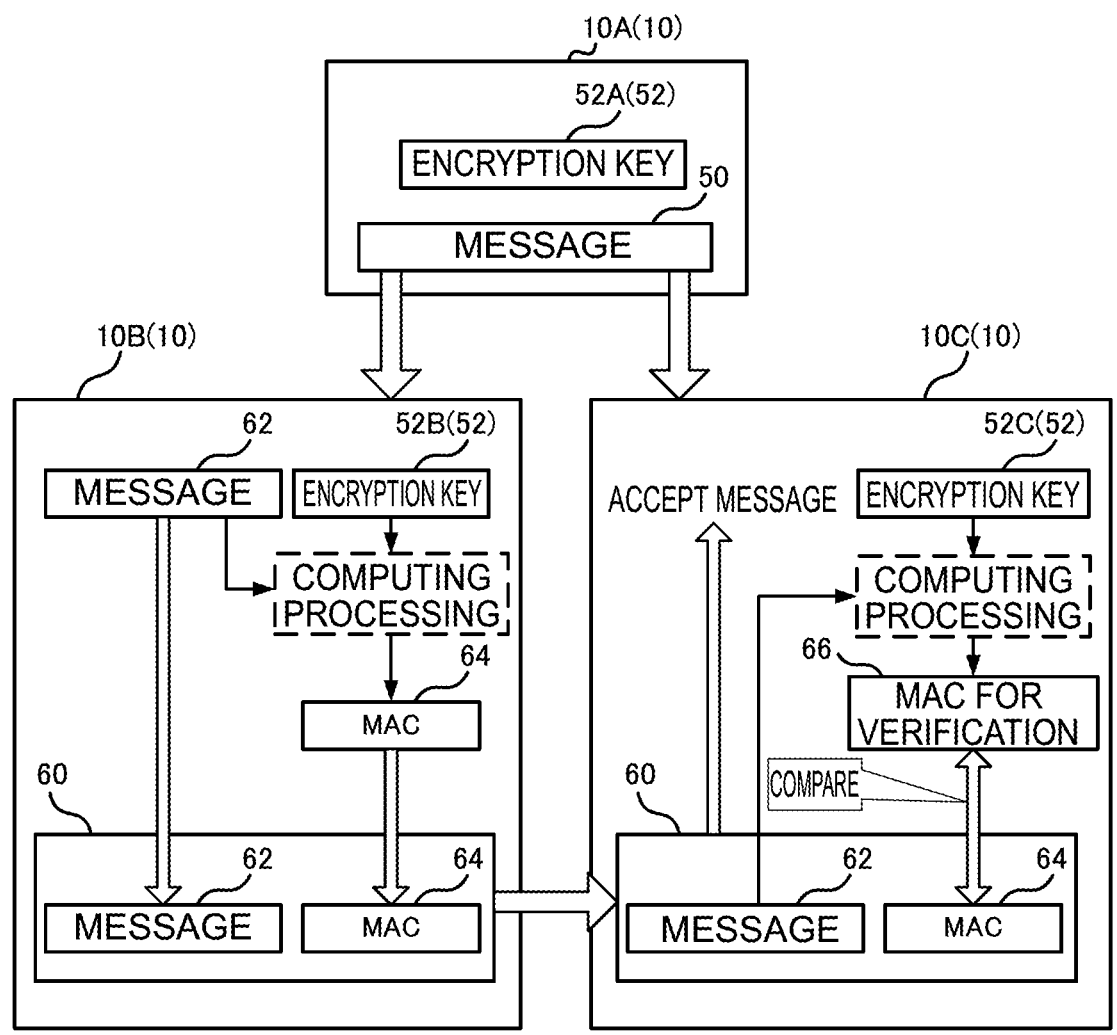
FIG. 5 is a drawing that explains the flow of data at usual times at transmitting-side and receiving-side ECUs.
Figure 6:
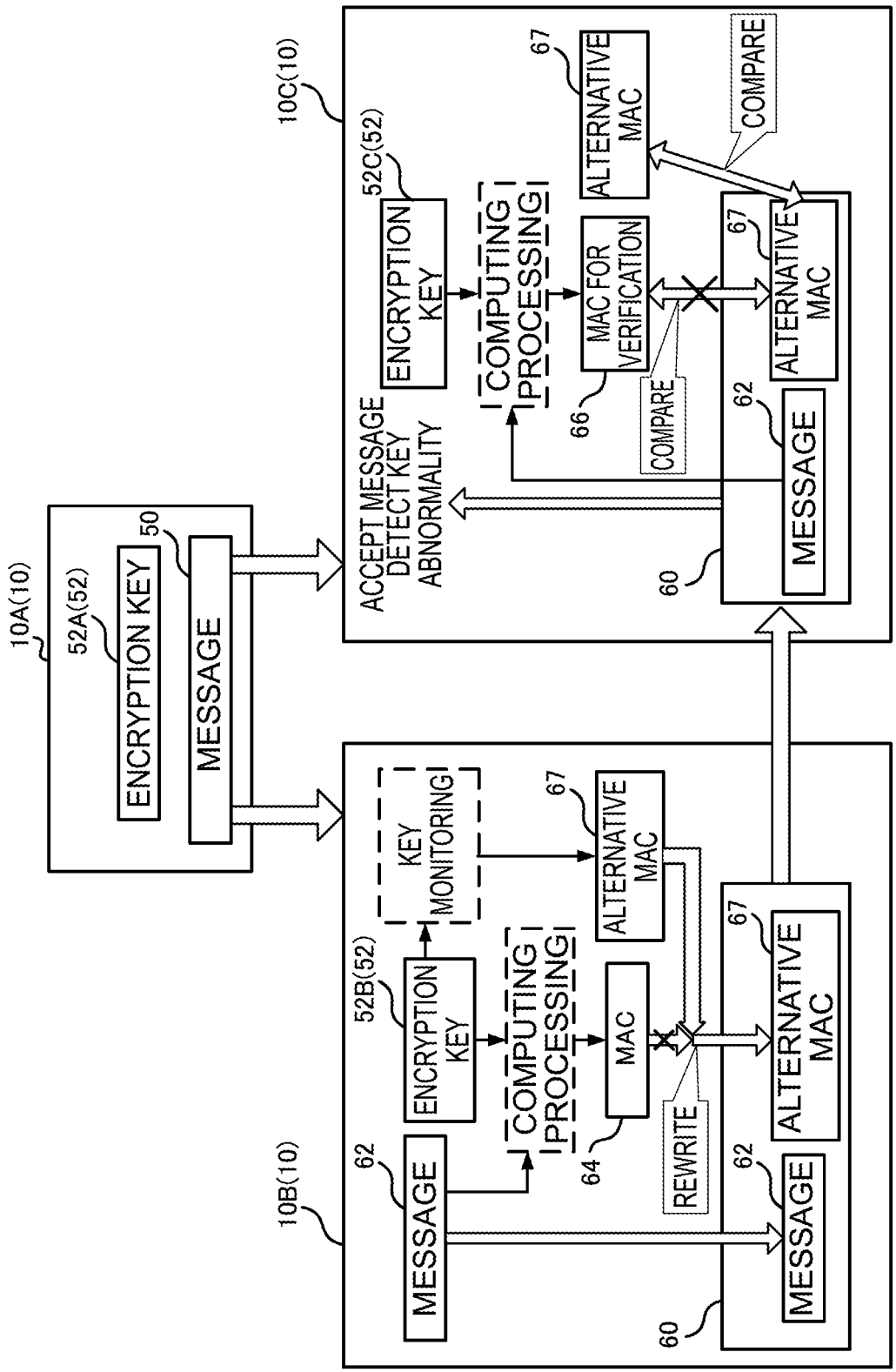
FIG. 6 is a drawing explaining the flow of data at the time of a key abnormality at the transmitting-side and receiving-side ECUs.

The receiving section 210 has the function of receiving communication frames from the other ECUs 10. Communication at the transmitting section 200 and the receiving section 210 of the present embodiment is controlled on the basis of a communication technique such as CAN protocol or CAN-FD protocol. Therefore, the communication frame includes a CAN ID and the communication data 60. As shown in FIG. 5 and FIG. 6, the communication data 60 includes the message 62 and a MAC 64 that is generated from the message 62. Note that the communication data 60 may include, in the lower bits of the message 62, a freshness value that is a message counter for preventing a retransmission attack. The MAC 64 is an example of the first authentication information.

The generating section 220 has the function of generating the MAC 64 from predetermined data by using the encryption key 52. As shown in FIG. 5, the generating section 220 of the transmitting-side ECU 10 executes computing processing on the basis of the encryption key 52 and the message 62 inputted from sensors and communication devices installed in the vehicle 11, and generates the MAC 64. Further, the generating section 220 of the receiving-side ECU 10 executes computing processing on the basis of the encryption key 52 and the message 62 received from the transmitting-side ECU 10, and generates a MAC 66 for verification. A common key that is used in common at both the transmitting side and the receiving side is used as the encryption key 52 in the present embodiment. The MAC 66 for verification is an example of the second authentication information.

The authenticating section 230 has the function of authenticating the message 62. The authenticating section 230 compares the MAC 64 that is included in the received communication data 60 and the MAC 66 for verification that is generated from the received message 62, and authenticates the message 62 in a case in which they match. In a case in which the MAC 64 and the MAC 66 for verification match, the authenticating section 230 judges that authentication is successful. In a case in which the MAC 64 and the MAC 66 for verification do not match, the authenticating section 230 judges that authentication has failed.

The key monitoring section 240 has the function of monitoring whether or not encryption keys 52B, 52C, which are stored in the ECUs 10B, 10C that are the slave ECUs, match an encryption key 52A at the ECU 10A that is the master ECU. Concretely, from a message 50 that was received from the ECU 10A and transmitted by using the encryption key 52A, the key monitoring section 240 of the ECU 10B judges whether or not the key value of the encryption key 52B stored in the key data 110 matches the key value of the encryption key 52A (see FIG. 5). Similarly, the key monitoring section 240 of the ECU 10C also judges whether or not the key value of the encryption key 52B matches the key value of the encryption key 52A.

In a case in which the encryption key 52 of its own device matches the encryption key 52A of the ECU 10A that is the master ECU, the key monitoring section 240 judges that the encryption key 52 of its own device is normal. In a case in which the encryption key 52 of its own device does not match the encryption key 52A, the key monitoring section 240 judges that the encryption key 52 of its own device is abnormal.

The accepting processing section 250 has the function of accepting the messages 62 that are acquired from the other ECUs 10 and the sensors of the respective sections, and providing the message 62 to the corresponding application. The vehicle 11 is controlled due to applications acquiring the messages 62 accepted by the accepting processing section 250. For example, in a case in which the ECU 10 is a meter ECU that displays information of the vehicle 11, the ECU 10 can cause information to be displayed on the meter panel on the basis of the message that the accepting processing section 250 accepted. Further, the accepting processing section 250 has the function of deleting, from the ROM 24 or the RAM 26, the messages 62 that are received in receiving processings under predetermined conditions.

The timer 260 has the function of clocking time. The timer 260 of the present embodiment measures the predetermined time period from the time when the ECU 10 is started-up.

(Flow of Processing)

Figure 7:
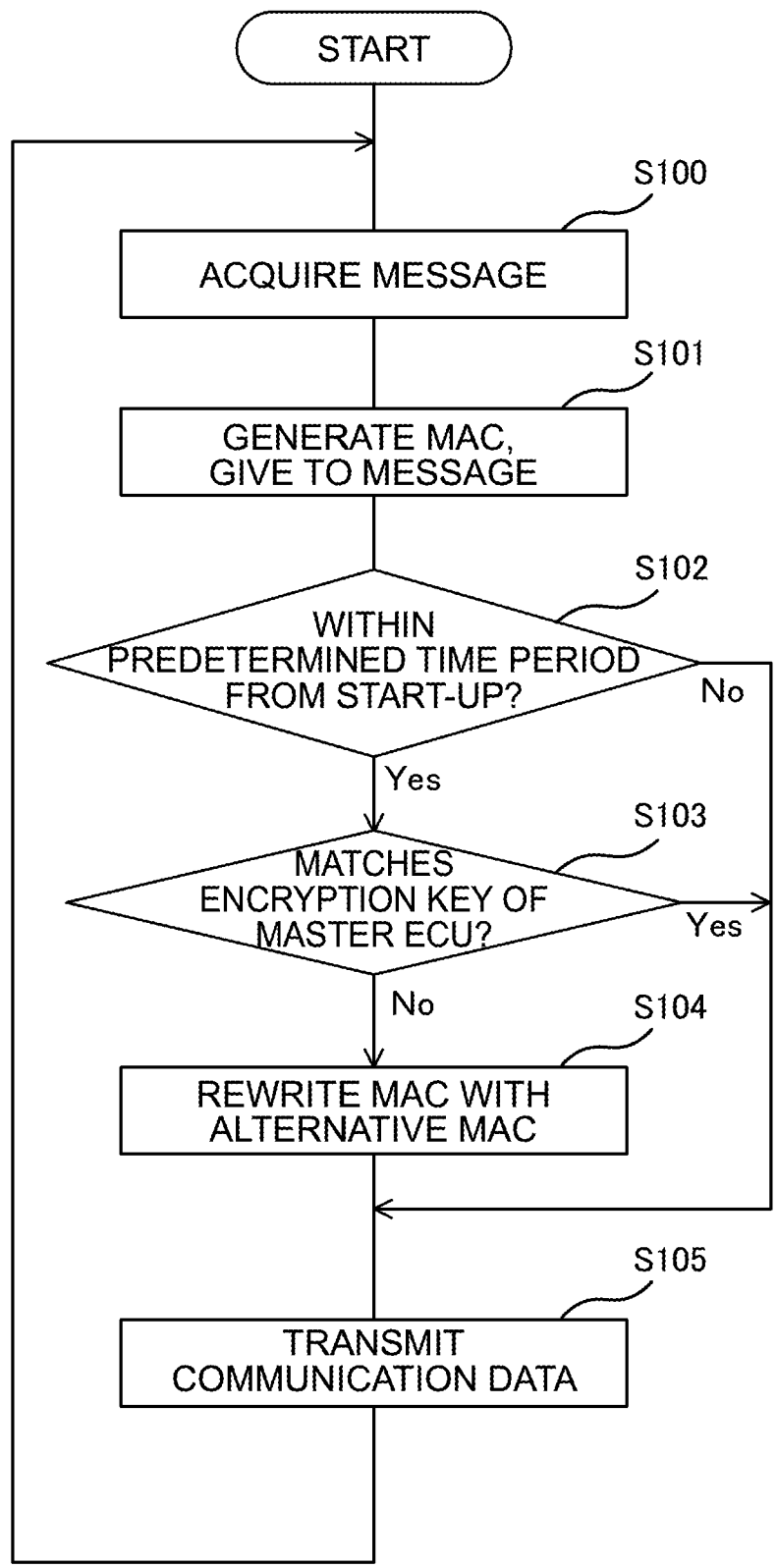
FIG. 7 is a flowchart showing the flow of transmitting processing at the transmitting-side ECU.
Figure 8:
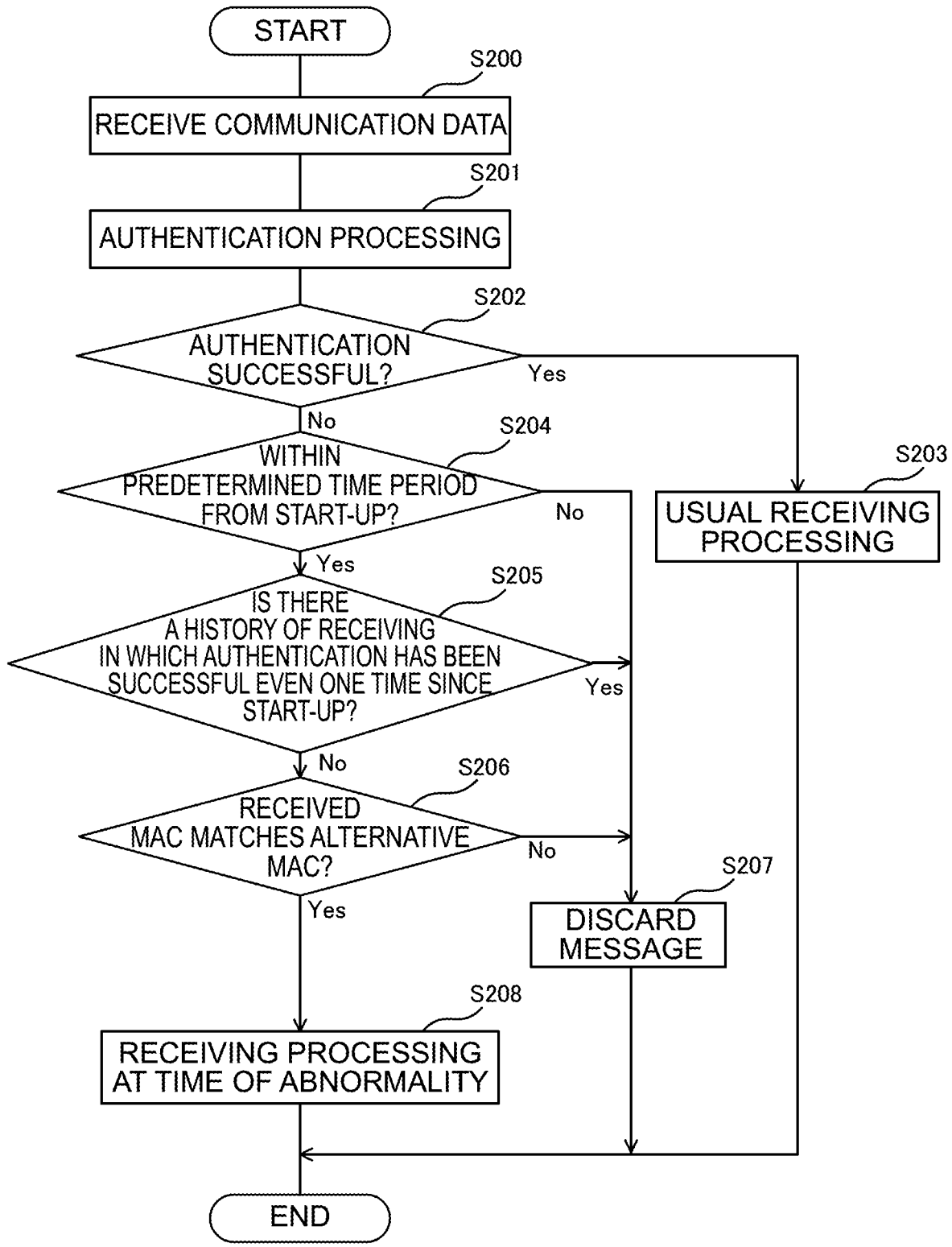
FIG. 8 is a flowchart showing the flow of receiving processing at the receiving-side ECU.

Next, the flows of processings that are executed at the respective ECUs 10 in a case in which the communication data 60 is transmitted from the ECU 10B to the ECU 10C in the present embodiment, are described by using the flowcharts of FIG. 7 and FIG. 8 and the example of FIG. 6. Note that similar processings can be executed also in a case in which the communication data 60 is transmitted from the ECU 10B to the ECU 10A, and in a case in which the communication data 60 is transmitted from the ECU 10A to the ECU 10B and the ECU 10C, and in a case in which the communication data 60 is transmitted from the ECU 10C to the ECU 10A and the ECU 10B.

The following transmitting processing is executed by the CPU 22 at the transmitting-side ECU 10B.

In step S100 of FIG. 7, the CPU 22 acquires the message 62. The acquired message 62 is given to the communication data 60 (see FIG. 6).

In step S101, the CPU 22 generates the MAC 64, and gives the MAC 64 to the message 62. Namely, the CPU 22 carries out computing processing that is based on the message 62 and the encryption key 52 so as to generate the MAC 64, and gives the generated MAC 64 to the lower bits of the message 62 (see FIG. 6).

In step S102, the CPU 22 carries out a judgment as to whether or not the current time is within a predetermined time period from the starting-up of the ECU 10B. If the CPU 22 judges that the current time is within a predetermined time period from the starting-up (if the judgment is YES in step S102), the CPU 22 moves on to step S103. On the other hand, if the current time is not within a predetermined time period from the starting-up, i.e., that the predetermined time period has elapsed (if the judgement is NO in step S102), the CPU 22 moves on to step S105.

In step S103, the CPU 22 carries out a judgment as to whether or not the encryption key 52B of the ECU 10B matches the encryption key 52A of the ECU 10A that is the master ECU. If the CPU 22 judges that the encryption key 52B matches the encryption key 52A, i.e., that the encryption key 52B is normal (if the judgement is Yes in step S103), the CPU 22 moves on to step S105. On the other hand, if the CPU 22 judges that the encryption key 52B does not match the encryption key 52A, i.e., that the encryption key 52B is abnormal (if the judgment is No in step S103), the CPU 22 moves on to step S104.

In step S104, the CPU 104 rewrites the MAC 64 with the alternative MAC 67.

In step S105, the CPU 22 transmits the communication data 60 to the receiving-side ECU 10C. Here, if the predetermined time period has elapsed from the starting-up of the ECU 10B, the communication data 60, at which the encryption key 52B matches the encryption key 52A and which is normal, includes the message 62 and the MAC 64 (see FIG. 5). On the other hand, the communication data 60, in a case in which the current time is within the predetermined time period from the starting-up of the ECU 10B and the encryption key 52B is abnormal, includes the message 62 and the alternative MAC 67 (see FIG. 6).

In succession therewith, receiving processing is executed by the CPU 22 at the receiving-side ECU 10C.

In step S200 of FIG. 8, the CPU 22 receives the communication data 60 from the transmitting-side ECU 10B.

In step S201, the CPU 22 executes authentication processing. Namely, the CPU 22 carries out computing processing that is based on the message 62 and the encryption key 52C, and generates the MAC 66 for verification, and compares this MAC 66 for verification and the MAC 64 that is included in the communication data 60 (see FIG. 5 and FIG. 6).

In step S202, the CPU 22 carries out a judgment as to whether or not authentication has succeeded. Namely, if the CPU 22 judges that authentication has succeeded (if the judgment in step S202 is Yes), the CPU 22 moves on to step S203. On the other hand, if the CPU 22 judges that authentication has not succeeded, i.e., that authentication has failed (if the judgment in step S202 is No), the CPU 22 moves on to step S204.

In step S203, the CPU 22 executes customary receiving processing. Namely, as shown in FIG. 5, the CPU 22 accepts the received message 62. Then, the receiving processing ends.

In step S204 of FIG. 8, the CPU 22 makes a determination as to whether or not the current time is within a predetermined time period from the starting-up of the ECU 10C. If the CPU 22 judges that the current time is within a predetermined time period from the starting-up (if the judgement in step S204 is YES), the CPU 22 moves on to step S205. On the other hand, if the CPU 22 judges that the current time is not within the predetermined time period from start-up, i.e., that the predetermined time period has elapsed (if the judgment in step S204 is NO), the CPU 22 moves on to step S207.

In step S205, the CPU 22 carries out a judgment as to whether or not there is a receiving history that expresses that authentication has succeeded even one time since the starting-up of the ECU 10C. In other words, the CPU 22 judges whether or not authentication has failed in all instances of receiving after the start-up. If the CPU 22 judges that there is a history of receiving that expresses that authentication has succeeded even one time since start-up (if the judgement in step S205 is Yes), the CPU 22 moves on to step S207. On the other hand, if the CPU 22 judges that there has not been, even one time since the starting-up, an instance of receiving in which authentication was successful (if the judgment in step S205 is No), the CPU 22 moves on to step S206.

In step S206, the CPU 22 carries out a judgement as to whether or not the received MAC 64 matches the alternative MAC 67. If the CPU 22 judges that the received MAC 64 matches the alternative MAC 67 (if the judgment in step S206 is Yes), the CPU 22 moves on to step S208. On the other hand, if the CPU 22 judges that the received MAC 64 does not match the alternative MAC 67 (if the judgement in step S206 is No), the CPU 22 moves on to step S207.

In step S207, the CPU 22 discards the message 62. Namely, the CPU 22 deletes the message 62 from the ROM 24 or the RAM 26. Then, the receiving processing ends.

In step S208, the CPU 22 executes receiving processing at the time of an abnormality. Namely, as shown in FIG. 6, the CPU 22 detects a key abnormality of the ECU 10B, and accepts the received message 62. Then, the receiving processing ends.

(Operation)

The vehicle communication system 12 of the present embodiment is structured to include the plural ECUs 10 that carry out communication with one another. The encryption key 52B and the alternative MAC 67, which is predetermined authentication information, are stored in the ROM 20B at each of the transmitting-side and receiving-side ECUs 10.

In the vehicle communication system 12 of the present embodiment, at a usual time at which there is no abnormality at the encryption key 52B, as shown in FIG. 5, the following processing is executed in the communication between the transmitting-side ECU 10B and the receiving-side ECU 10C. The CPU 22 of the ECU 20B generates the MAC 64 on the basis of the encryption key 52B and the message 62, and transmits the generated MAC 64 and the message 62 to the ECU 10C as the communication data 60.

On the other hand, on the basis of the encryption key 52C and the message 62 received from the ECU 10B, the CPU 22 of the ECU 10C generates the MAC 66 for verification that is the second authentication information, and collates the MAC 64 received from the ECU 10B and the generated MAC 66 for verification, and authenticates the message 62. In this case, the encryption key 52B at the ECU 10B and the encryption key 52C at the ECU 10C being in a corresponding relationship, i.e., the keys being common keys, is a case in which the key value of the encryption key 52B and the key value of the encryption key 52C match, and authentication is successful. Due to authentication of the message 62 being successful, the message 62 is accepted by the application, and control that is based on the message 62 is executed at the ECU 10C.

In contrast, at the vehicle communication system 12 of the present embodiment, at the time of a key abnormality in which there is an abnormality at the encryption key 52B, as shown in FIG. 6, the following processing is executed in the communication between the transmitting-side ECU 20B and the receiving-side ECU 10C. Here, for example, a case in which, as a result of replacing the ECU 10B, the key value differs from the key value of the encryption key 52A of the ECU 10A that is the master ECU, is given as an example of case in which there is an abnormality at the encryption key 52B. First, if there is an abnormality at the encryption key 52B, the CPU 22 of the ECU 10B rewrites the MAC 64 with the alternative MAC 67, and transmits the alternative MAC 67 and the message 62 to the ECU 10C.

On the other hand, in a case in which authentication has not been successful even one time within a predetermined time period after start-up of the ECU 10C, and the received MAC 64 and the alternative MAC 67 match, the CPU 22 of the ECU 10C detects that there is an abnormality at the encryption key 52B of the ECU 10B. Then, the message 62 is, together with a notification that a key abnormality has been detected, accepted at the application, and control that is based on the message 62 is executed provisionally at the ECU 10C.

(Synopsis)

The vehicle communication system 12 of the present embodiment caries out communication by CAN protocol or CAN-FD protocol, but, because there is communication in one direction, even if authentication fails at the receiving-side ECU 10C, there is no way of knowing whether there is trouble with the transmitting-side ECU 10B or the encryption key 52B is different.

On the other hand, it can be thought to, in addition to the communication data 60 that has the MAC 64 attached thereto, simultaneously transmit, to the ECU 10C, a communication frame that expresses the state of the encryption key 52B. However, if the communication frame that expresses the state is attacked, the ECU 10C will erroneously detect that there is trouble with the ECU 10B, in spite of the fact that there is simply a difference in keys. Further, the load on the bus 14 increases due to the twofold communication of the communication frame of the message 62 and the communication frame for the encryption key 52B. As a result, there is the risk that communication itself will not be established.

In contrast, in accordance with the present embodiment, even if there is communication in one direction, the state of the encryption key 52B at the transmitting-side ECU 10B can be understood without increasing the number of communication frames. Concretely, in the present embodiment, if updating of the encryption key 52B was not carried out at the time when the transmitting-side ECU 10B was replaced, authentication fails at the ECU 10C. However, up until the time that the encryption key 52B is updated and authentication succeeds, a key abnormality that requires updating of the encryption key 52B is detected provided that the received MAC 64 and the alternative MAC 67 match.

On the other hand, if the encryption key 52B is updated and authentication is successful once, thereafter, even if the received MAC 64 and the alternative MAC 67 match, a key abnormality that requires updating of the encryption key 52B is not detected. Therefore, in accordance with the present embodiment, in spite of the fact that updating of the encryption key 52B has been carried out, thereafter, even if the alternative MAC 67 is received, it being erroneously detected that a key abnormality that requires updating of the encryption key 52B has arisen is suppressed.

Further, the present embodiment has the feature that the message 62 is accepted in a case in which a key abnormality that requires updating of the encryption key 52B is detected. Namely, during a predetermined time period after starting-up of the ECU 10C, up until updating of the encryption key 52B is carried out and authentication is successful, the message 62 is accepted provided that the received MAC 64 and the alternative MAC 67 match. Here, the above-described "predetermined time period" is assumed to be the time period that is needed from the starting-up of the ECU 10 until the completion of preparations relating to authentication at the device. In accordance with the present embodiment, during the predetermined time period after start-up, even if the encryption key 52B is different from a normal key, the message 62 is accepted as a provisional measure. Therefore, in accordance with the present embodiment, control of the vehicle 11 can be ensured until updating of the encryption key 52B is carried out.

Further, if the encryption key 52B is updated and authentication succeeds once, thereafter, even if the received MAC 64 and the alternative MAC 67 match, a key abnormality that requires updating of the encryption key 52B is not detected, and the message 62 is not accepted. Therefore, in accordance with the present embodiment, erroneous detection that a key abnormality that requires updating of the encryption key 52B has arisen in spite of the fact that updating of the encryption key 52B has been carried out, and the message 62 that should be discarded being accepted, are suppressed.

Note that, after the predetermined time period has elapsed, if authentication fails, the message 62 is discarded. Further, if the received MAC 64 and the alternative MAC 67 do not match, the message 62 is discarded. Due thereto, security can be ensured by discarding the message 62 in a case in which a key abnormality that requires updating of the encryption key 52B has not arisen.

Further, if the encryption key 52B is updated and authentication succeeds once, thereafter, even if the MAC 64 that is received during the predetermined time period and the alternative MAC 67 match, the message 62 is discarded. Accordingly, in accordance with the present embodiment, security after updating of the encryption key 52B is carried out can be ensured.

(Notes)

Note that any of various types of processors other than a CPU may execute the various processings that the CPU 22 executes by reading in software (programs) in the above-described embodiment. Examples of processors in this case include PLDs (Programmable Logic Devices) whose circuit structure can be changed after production such as FPGAs (Field-Programmable Gate Arrays) and the like, or dedicated electrical circuits that are processors having circuit structures that are designed for the sole purpose of executing specific processings such as ASICs (Application Specific Integrated Circuits) and the like, or the like. Further, the above-described processings may be executed by one of these various types of processors, or may be executed by combining two or more of the same type or different types of processors (e.g., plural FPGAs, or a combination of a CPU and an FPGA, or the like). Further, the hardware structures of these various types of processors are, more concretely, electrical circuits that combine circuit elements such as semiconductor elements and the like.

Further, the above embodiment describes a form in which programs are stored in advance (are installed) in a non-transitory storage medium that can be read by a computer. For example, the execution program 100 is stored in advance in the ROM 24. However, the present disclosure is not limited to this, and the execution program 100 may be provided in a form of being recorded on a non-transitory storage medium such as a CD-ROM (Compact Disc Read Only Memory), a DVD-ROM (Digital Versatile Disc Read Only Memory), a USB (Universal Serial Bus) memory, or the like. Further, the execution program 100 may be in a form of being downloaded from an external device via a network.

The flows of processings described in the above embodiment are examples, and unnecessary steps may be deleted, new steps may be added, or the order of processings may be rearranged, within a scope that does not depart from the gist of the present disclosure.

What is claimed is:

1. A vehicle communication system, comprising a plurality of control devices configured to carry out communication with one another, the plurality of control devices comprising a transmitting device at a transmitting side and a receiving device at a receiving side, wherein:

the transmitting device includes a first memory in which a first encryption key and predetermined authentication information are stored, and a first processor that is coupled to a first memory, the receiving device includes a second memory in which a second encryption key and the predetermined authentication information are stored, and a second processor that is coupled to the second memory, the first processor at the transmitting device:
generates first authentication information based on a message and the first encryption key that is stored in the first memory of the transmitting device,
determines whether an abnormality exists at the first encryption key, and
in response to determining that there is no abnormality at the first encryption key that is stored in the memory of the transmitting device, transmits the generated first authentication information and the message to the receiving device, and
in response to determining that there is the abnormality at the first encryption key that is stored in the memory of the transmitting device, transmits the predetermined authentication information and the message that are stored in the first memory of the transmitting device to the receiving device, and the second processor at the receiving device:
generates second authentication information based on the second encryption key stored in the second memory of the receiving device and the message received from the transmitting device,
collates the first authentication information received from the transmitting device and the generated second authentication information, and authenticates the message, and
after starting-up of the receiving device, in response to authentication having not succeeded even once, and in a case in which the first authentication information or the predetermined authentication information received from the transmitting device and the predetermined authentication information stored in the second memory of the receiving device match, accepts the received message regardless of a result of the authentication.

2. The vehicle communication system of claim 1, wherein the second processor of the receiving device detects the abnormality of the second encryption key in a case in which the received first authentication information and the predetermined authentication information match.

3. The vehicle communication system of claim 1, wherein the second processor of the receiving device discards the received message in a case in which the authentication fails and a predetermined time period from start-up has been exceeded.

4. The vehicle communication system of claim 1, wherein the second processor of the receiving device discards the received message in a case in which the authentication fails in a current instance of receiving, and, after start-up of the receiving device, the authentication succeeds once.

5. The vehicle communication system of claim 1, wherein the second processor of the receiving device discards the received message in a case in which the authentication fails, and the first authentication information received from the transmitting device and the predetermined authentication information do not match.

6. The vehicle communication system of claim 1, wherein, if there is the abnormality at the first encryption key during a predetermined time period from starting-up of the transmitting device, the first processor of the transmitting device rewrites the generated first authentication information with the predetermined authentication information.

\* \* \* \* \*